US012197232B2

(12) United States Patent
Vougioukas et al.

(10) Patent No.: US 12,197,232 B2
(45) Date of Patent: Jan. 14, 2025

(54) ROBOTIC CROP TRANSPORT

(71) Applicant: The Regents of the University of California, Oakland, CA (US)

(72) Inventors: Stavros Vougioukas, Davis, CA (US); Chen Peng, Davis, CA (US); Dennis L. Sadowski, Davis, CA (US)

(73) Assignee: The Regents of the University of California, Oakland, CA (US)

(*) Notice: Subject to any disclaimer, the term of this patent is extended or adjusted under 35 U.S.C. 154(b) by 252 days.

(21) Appl. No.: 17/752,335

(22) Filed: May 24, 2022

(65) Prior Publication Data
US 2022/0374026 A1 Nov. 24, 2022

Related U.S. Application Data

(60) Provisional application No. 63/344,949, filed on May 23, 2022, provisional application No. 63/225,219, filed on Jul. 23, 2021, provisional application No. 63/192,234, filed on May 24, 2021.

(51) Int. Cl.
*G05D 1/00* (2024.01)
*A01D 90/16* (2006.01)
*G06Q 10/0631* (2023.01)
*G06Q 50/02* (2012.01)

(52) U.S. Cl.
CPC ........... *G05D 1/0297* (2013.01); *A01D 90/16* (2013.01); *G05D 1/0274* (2013.01); *G06Q 10/06316* (2013.01); *G06Q 50/02* (2013.01)

(58) Field of Classification Search
CPC .. G05D 1/0297; G05D 1/0274; G05D 1/0278; A01D 90/16; A01D 46/00; G06Q 10/06316; G06Q 50/02
See application file for complete search history.

(56) References Cited

U.S. PATENT DOCUMENTS

2019/0094857 A1* 3/2019 Jertberg ............... G05D 1/0282

* cited by examiner

*Primary Examiner* — Yuen Wong
(74) *Attorney, Agent, or Firm* — Park, Vaughan, Fleming & Dowler LLP (57) ABSTRACT

A system, apparatus and method are provided for robotically assisting the harvest of a crop. Instrumented picker carts include sensors for detecting amounts of harvested crop (e.g., fill ratios) of containers carried by the carts, communication modules for communicating their locations and detected crop amounts to a field computer, and components for signaling for robotic service. The field computer predicts when a cart that requests service will have a full container and where it will be located at that time, then decides whether to approve the request. If the request is approved, a robot is assigned and is given (or generates) a path to the cart's predicted location, and begins moving toward the location so as to arrive near (and preferably before) the predicted time. Robots include means for moving (e.g., wheels, motors, steering components, power sources), navigation modules, computing components for controlling their movement, and communication modules.

10 Claims, 6 Drawing Sheets

ROBOTIC CROP TRANSPORT

RELATED APPLICATION(S)

This application claims priority to U.S. Provisional Application No. 63/192,234, filed May 24, 2021, U.S. Provisional Application No. 63/225,219, filed Jul. 23, 2021, and U.S. Provisional Application No. 63/344,949, filed May 23, 2022, all of which are incorporated herein by reference.

GOVERNMENT LICENSE RIGHTS

This invention was made with U.S. Government support by the Department of Agriculture under contract number 2013-67021-21073. The U.S. Government has certain rights in the invention.

BACKGROUND

This disclosure relates to the fields of robotics and transportation. More particularly, systems, apparatus, and methods are provided for robotic crop transport.

Manual harvesting of some crops, like table grapes, cherry tomatoes, strawberries, and other berry fruits, is labor-intensive. These crops are often planted in spaced parallel rows with furrows/aisles between them. Pickers walk along the rows or furrows and harvest selectively, based primarily on ripeness criteria. Each picker places the harvested crop in containers (e.g., tubs, clamshells arrayed in a tray), which are conveyed by a cart operated similarly to a wheelbarrow. When a container or cart becomes full, the picker manually transports the harvested crop to a collection station at the edge of the field in which he or she is working, unloads, and resumes picking with empty containers. Depending upon the crop, labor for manual harvesting may account for up to 60% of yearly operating costs per acre, and walking time for pickers has been measured as amounting for up to 22% of total harvest time. Thus, pickers spend significant amounts of time walking to and from collection points instead of harvesting.

SUMMARY

In some embodiments, systems, apparatus and methods are provided for aiding the harvesting of a crop using a robotic vehicle. The system includes one or more multiple robotic vehicles for delivering empty containers to pickers and transporting full containers from the pickers to one or more collection points; instrumented picker carts for signaling when service from a robot is required; and a field computer that communicates with the vehicles and the carts. The field computer includes electronics for conducting the communications and for executing software for predicting pickers' operations and scheduling movement of the vehicles.

In these embodiments, a robotic vehicle travels to a person that is manually picking the crop, is loaded by the picker with one or more full containers of the crop, provides the picker with empty containers if/as necessary, and returns the loaded crop to a collection point. The picker therefore is able to spend more time harvesting the crop than would be possible if he or she were required to carry the harvested crop to the collection point.

In some embodiments, based on status messages received from picker carts, the system predicts when a picker will fill his or her available container(s), and dispatches a vehicle to the picker so that it arrives at or near the picker's location close in time to when the container or containers are filled. In some implementations, however, the system may determine that it would be more efficient for the picker to manually deliver a load to the collection point. For example, he or she may be near the collection point, or the system may determine that the picker could deliver the load and return in less time than it would take for a vehicle to reach him or her.

A picker cart may comprise one or more load sensors for detecting an amount of crop loaded in a container carried by the cart, a communication module for communicating this and/or other information (e.g., location, time, direction of movement) to the field computer, an input operable by a picker to request service from a robot, and an output for signaling to the picker whether a request has been approved.

A robot or robotic vehicle may comprise means for moving (e.g., wheels, tracks, legs, motors, servos, steering), communication components (e.g., receiver, transmitter, antenna) for sending status information (e.g., location, current task (if any), operating condition, path (if moving), destination (if moving), load), one or more navigation modules (e.g., GPS receivers) for generating and/or following a path to a target destination, one or more cameras (e.g., for avoiding obstacles), a small computer or a processor for controlling its movement (e.g., by sending commands to a motor and a steering module), etc.

The field computer may comprise one or more communication modules for communicating with picker carts and robots (via the same or different communication protocols) and a scheduling server. The scheduling server may comprise a prediction module for predicting cart statuses, such as where a cart will be when its container(s) is/are full and a time at which that will occur, a scheduling module for dispatching robots to service pickers and their carts, a coordination module for helping avoid collisions between robots and other objects (e.g., other robots, people, equipment), and/or other components.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

Overview

In some embodiments, a robotic vehicle system and associated apparatus are provided, along with methods of using the system and/or apparatus to assist the harvesting of a crop, particularly a crop that is collected manually by pickers (e.g., grapes, berries, tomatoes). In particular, a robotic vehicle may deliver empty containers (e.g., buckets, clamshell containers, trays, tubs) to pickers and take away full ones for delivery to a collection point. Arrival of a robotic vehicle at a picker's location may be timed or scheduled to maximize use of the vehicle and the picker's productivity.

A robotic vehicle in these embodiments may be equipped with a power source (e.g., one or more batteries, one or more solar panels); communication equipment (e.g., a transmitter, a receiver, a Wi-Fi® interface); multiple wheels, tracks, or other means of locomotion; means for powering and conducting the locomotion (e.g., servos, gears, motors, linkages); a bed or deck for conveying crop containers and/or other items; and/or other equipment. A field computer or server executes software to communicate with robotic vehicles assisting in the harvest, predict when and where a vehicle is needed, select one or more routes (e.g., a primary route, one or more alternative routes) for each vehicle that is to move, dispatch a vehicle, recall a vehicle, receive vehicle requests from pickers, determine whether a given request should be accepted (and a vehicle dispatched), signal a picker regarding whether and when a vehicle is on the way, etc.

Pickers may use traditional picking carts/wheelbarrows that have been enhanced to cooperate with the systems described herein. For example, a picking cart operated by a picker may be equipped with one or more load sensors or other measuring device(s) for determining or estimating the weight or volume of the crop that the picker has harvested (including or excluding the weight of the tray(s) in which the crop is placed), a communication module (e.g., a Wi-Fi interface circuit) for communicating with a field computer, a power source (e.g., battery, solar panel(s)), and one or more components (e.g., buttons, switches, antenna) for requesting service from a robotic vehicle and/or for conducting some other communication between the picker and the system. A picking cart may also be equipped with a GNSS (Global Navigation Satellite System) module, such as a GPS (Global Positioning System) receiver, for recording geodetic locations of the cart.

As the picker collects the crop and places it in trays on his cart, the cart can automatically and periodically report measurements of the amount of collected crop, its location, and/or other information. The picking cart may also include one or more picker-operated controls for manually signaling for service from a robotic vehicle, requesting assistance, and/or for other purposes. Illustratively, the picker may activate a control when his tray(s) is/are filled or reach an approximate fill ratio (e.g., 75%, 90%), which reflects how full his cart is currently loaded. A picker's current fill ratio (or FR) may depend upon the size of a tray, his harvesting rate, and/or other factors. As one alternative, the cart's weight sensor may allow it to recognize when the tray has reached the target fill ratio, in which case it may automatically signal the need for a robot.

To support FR measurements, a full tray of the crop may be weighed ahead of time (e.g., at the start of harvesting operations). Picker carts or the field computer may then calculate FR by dividing the current weight of the picker's tray(s) by the full tray weight. In some embodiments, full tray weights may be determined for individual pickers. For example, as trays filled by a given picker are turned into collection stations, they may be weighed in order to determine an average full tray weight to be used when calculating that picker's current FR.

In some embodiments, data reported and/or stored by picker carts may be used to generate a crop yield map for some or all of the field being harvested; the map may be created during the robot-assisted harvesting and/or afterward. For example, the carts' periodically or regularly reported data regarding their location and current load (e.g., by weight, by fill ratio) may be aggregated to indicate how much of the crop was harvested from different areas of the field (e.g., crop beds, portions of crop beds, field quadrants). Analysis of the aggregated data may help identify areas of the field that produce inferior or superior results, which may allow a farmer to alleviate a problem or identify factors that produce increased yields. In some implementations of these embodiments, a farmer may apply different treatments to different areas of a field (e.g., different fertilizers, pest control agents, or watering schemes) and easily determine the results of the different treatments.

The field computer executes software (discussed in more detail below) to predict when and where a picker's tray(s) will become full. In general, based on data received from a picker's cart and/or other information (e.g., the number/type of empty containers previously provided to the picker, the capacity of the picker's containers, the cart's current location, harvest rate), the field computer or server can predict when and where the picker (and the picker cart) will be when his tray or trays need to be emptied or replaced. Detection or prediction of a full tray causes the field computer to dispatch a robotic vehicle (also known as a crop-transport robot), to service the picker's cart. In some implementations, however, a vehicle may not be dispatched to a picker until a request for the vehicle is received, either manually from the picker or automatically from a sensor that detects a full load on the picker's cart. Alternatively, the system may determine in some situations that it would be more efficient for the picker to manually deliver his containers to a crop collection point. For example, if a picker is less than a threshold distance from the end of his row (e.g., five meters), and a collection station is within the headland at that end of the row, a request from the picker for robotic vehicle service may be rejected.

Although a picker may need to walk a short distance to deliver a tray to a robot (e.g., across a furrow), he is relieved of the need to walk all the way to a collection point or station. Instead, the robotic vehicle delivers the full trays to the collection point and receives empty trays as needed to exchange with pickers for their full trays.

After a picker loads his tray or trays on a vehicle, he may press a button or manipulate some other control that commands the robot to travel to the collection point to be unloaded. Alternatively, the robot (e.g., via a weight sensor) may recognize that it has been laden, after which it may automatically head for the collection station. Vehicles also include communication modules in order to communicate with the field computer, like the picking carts, and may also include GNSS (e.g., GPS) receivers.

For safety purposes, robotic vehicles may travel at low speeds, such as between 0.5 and 2.5 meters per second. Because a picker serviced by a given vehicle may be more than a hundred meters away from the vehicle when needing service from the vehicle, dynamic and efficient routing of vehicles is essential. In the interest of efficient routing, the system may strive to ensure that the overall reduction in walking time of pickers engaged in a particular robot-assisted harvest is greater than the waiting time experienced by pickers as they wait to be serviced by robotic vehicles.

Robotic vehicles are configured differently in different embodiments. For example, in some embodiments robots may traverse individual furrows that are wide enough to accommodate the vehicle's wheels, tracks or other means of locomotion. They may traverse a furrow in the same direction a picker moves, or in the opposite direction (e.g., to reach a point ahead of the picker where he or she is expected to have a full cart). In other embodiments, a robot may straddle two (or more) furrows, in which case a body of the robot may pass over a relatively low-growing crop that is being harvested (e.g., strawberries). For example, a robot that features four wheels arranged akin to an automobile's, pairs of wheels on either side may traverse each of two adjacent furrows. As discussed elsewhere herein, cameras, navigational sensors, and/or other components of robotic vehicles may assist the vehicles in navigating a field.

In the interest of pickers' health, the system may determine that a picker needs to or should stand up for a while, in which case he may be requested (e.g., via a communication component on his picking cart) to deliver his container(s) to a collection point instead of continuing to harvest or waiting for a vehicle. Similarly, in embodiments in which a picker requests a robot before one will be dispatched (e.g., by activating a button or other control on his picking cart), the picker may refrain from requesting a robot if he desires to take a break from stooping by carrying his tray to a collection station.

In an embodiment in which one robotic vehicle is deployed for every three pickers (i.e., a ratio of 1:3), an increase in harvest efficiency of approximately 10% was achieved while reducing the mean non-productive time by approximately 60%. Thus, in some embodiments, a given robot services multiple pickers at different times rather than being dedicated to a single picker and experiencing extended periods of idleness.

Illustrative Operating Environment

Figure 1A:
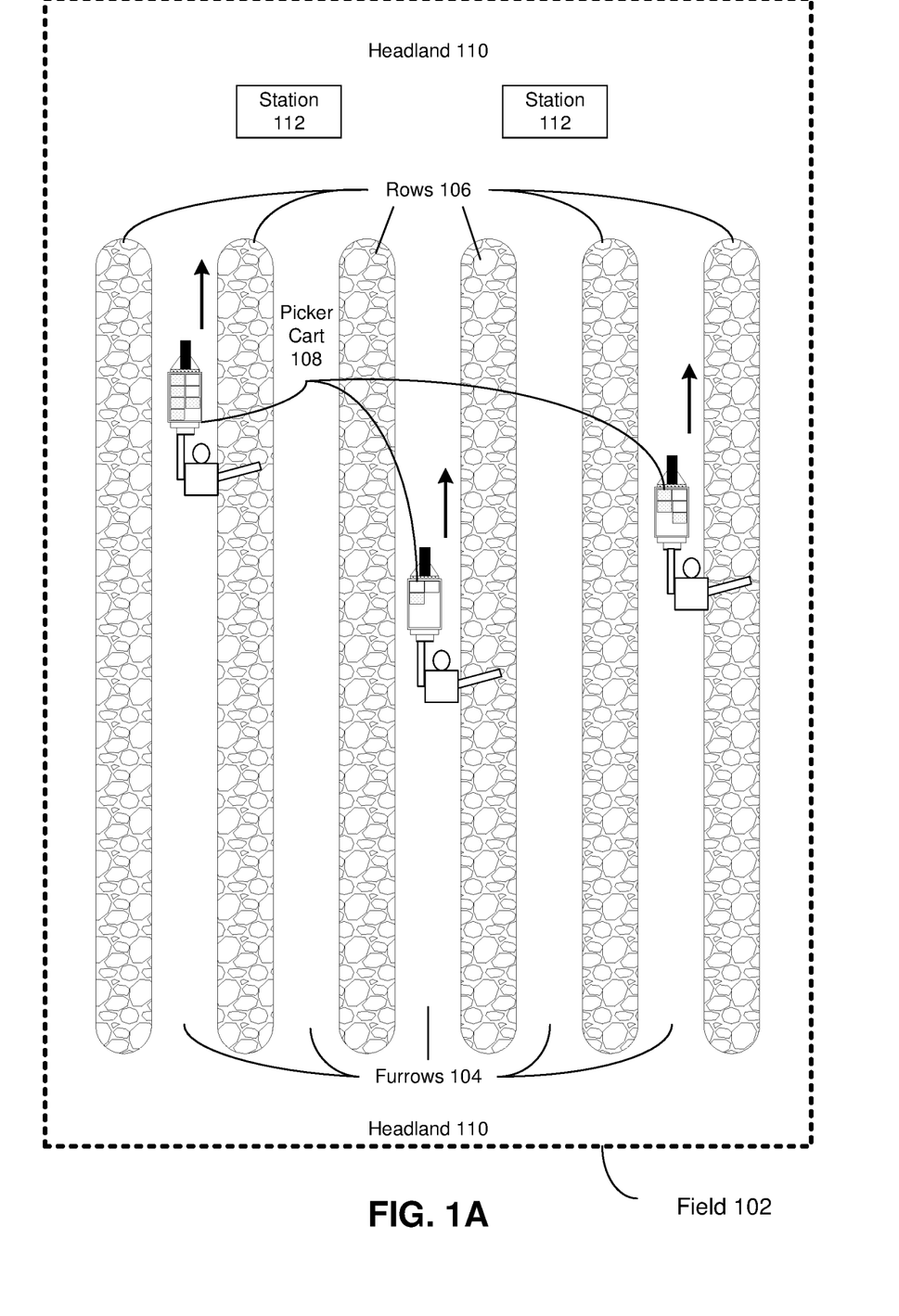
FIG. 1A is a block diagram depicting a field of crop to be harvested in accordance with some embodiments.
Figure 1B:
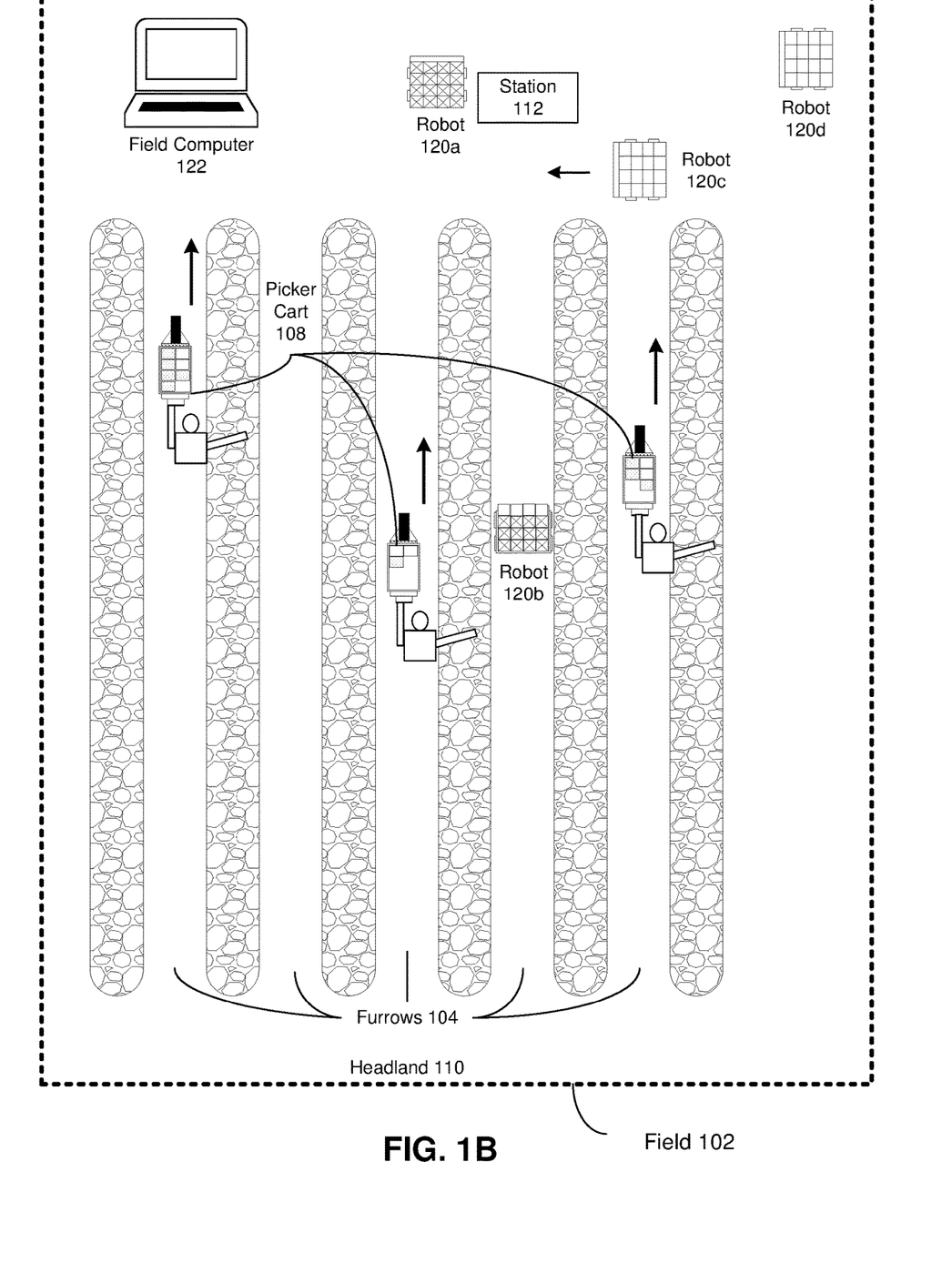
FIG. 1B is block diagram of the field of FIG. 1A augmented to facilitate robotic crop transport, in accordance with some embodiments.

FIGS. 1A-B are diagrams of an illustrative environment in which a system, apparatus, or method described herein may be implemented, according to some embodiments. In particular, FIG. 1A depicts a field 102 in which a crop to be harvested, such as grapes, tomatoes, some type of berry (e.g., strawberries, blackberries, raspberries, blueberries), or another fruit or vegetable.

In the illustrated embodiments, the crop is grown in and harvested from beds or rows 106 that are separated by furrows 104. Furrows are sufficiently wide to allow human pickers to traverse while pushing or pulling picker carts 108 on which harvested crop is initially placed. One or more headlands 110 encompass areas at one or both ends of the rows and furrows. Collection stations 112 are located within at least one headland 110 and serve as locations to which robotic vehicles (and sometimes the pickers) bring trays or other containers (e.g., bushels, baskets, buckets) of harvested crop for transportation away from the field. Collection stations (and robots) can also exchange empty trays for full ones.

FIG. 1B depicts field 102 after it is augmented to use and support robotic vehicles for transporting the harvested crop. Field computer 122, which may comprise a portable computing device such as a laptop computer, is located and operated at a collection station 112 (or elsewhere in the field), and engages in wireless communication with robots (or robotic vehicles) 120 (e.g., robots 120a, 120b, 120c), picker carts 108, and/or other entities. For example, the field computer may communicate with an entity remote from the field in order to signal for a truck or other vehicle when a load of harvested crop is ready for transportation. As another example, the field computer may communicate with a remote computer system that performs the same or similar processing performed by field computer 122 as described herein, and/or complementary processing, such as providing updated program code, storing live or backup data, etc.

In FIG. 1B, robot 120a has a full or nearly full load and is located at a collection station 112 where it will be unloaded and may receive one or more empty trays or other containers to deliver to pickers. Robot 120b is partially loaded, and will report to a collection station 112 when full. Robot 120c is unladen, except possibly with empty trays, and may be parked awaiting an assignment or may be en route to a picker. Robot 120d may be parked because it is not needed, may be inoperative, may be receiving maintenance, may be having its batteries recharged, or may be stationary for some other reason.

A typical field may comprise approximately 80-120 rows, each one around 100 meters long. To assist with movement of the robotic vehicles, the field may be modeled using multiple points, such as points identifying each end of each furrow and/or each crop row, corners of the field, locations of collection stations, points delineating or outlining areas they may or may not traverse, other locations at which the robots may or will be needed (e.g., parking locations when not in use, charging sites), etc. The points may be captured with a GPS or other GNSS device and modeled within software executed by field computer 122 to schedule and/or route robots 120 to pickers, and/or may be used by robots to autonomously travel to specified locations.

Communication between the field computer and picker carts may need to accommodate ranges of up to approximately 400 m, and be bidirectional, but does not require high bandwidth because of the simple nature of the communications (e.g., to request robotic service; to signal whether a request has been accepted or rejected). Communication between the field computer and the robotic vehicles, however, must be more robust. For example, robots must regularly apprise the field computer of their statuses (e.g., idle, en route to a collection station to unload, en route to a picker, exact location within the field, path of intended movement). Meanwhile, the field computer must route or reroute robots as necessary to avoid collisions, assign tasks to robots, etc.

Figure 2:
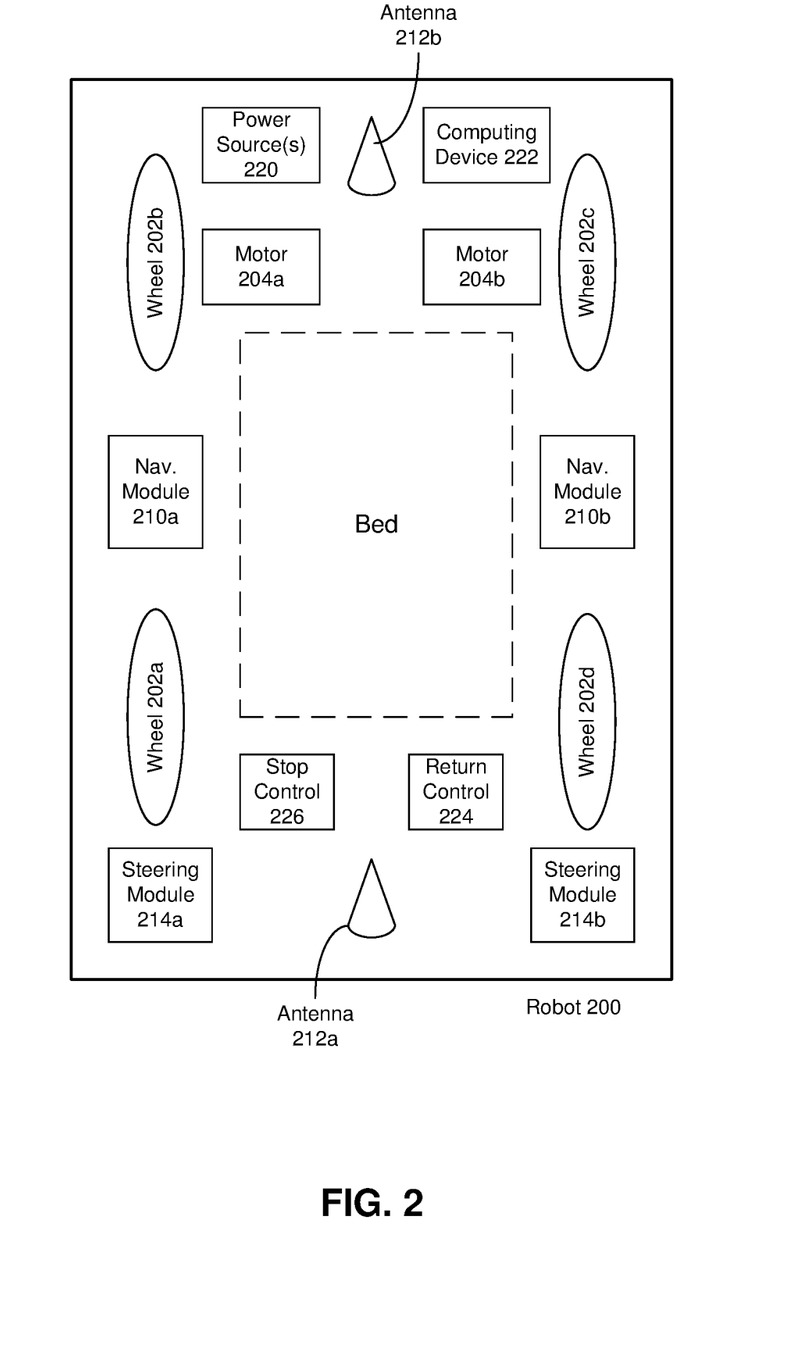
FIG. 2 is a block diagram depicting a robotic vehicle for transported a harvested crop, in accordance with some embodiments.

FIG. 2 is a block diagram depicting a robotic vehicle for transporting a harvested crop, according to some embodiments. In these embodiments, robot 200 includes wheels 202 (e.g., wheels 202a-202d) connected to and driven by motors 204 (e.g., motors 204a, 204b). In an illustrative implementation, each motor 204 is a DC (Direct Current) motor with a gearbox and incremental encoder, and is coupled to the rear wheel on each side of robot 200 (e.g., wheels 204b, 204c).

Robotic vehicle 200 includes one or more navigation modules 210 (e.g., modules 210a, 210b), which may be or include GPS receivers. In embodiments in which robot 200 travels with one pair of wheels (e.g., wheels 202a, 202b) in one furrow and the other pair (e.g., wheels 202c, 202d) in another furrow, the use of dual navigation modules helps ensure correct alignment of the vehicle by repeatedly determining the robot's position and heading (e.g., direction of travel). One or more antennae 212 (e.g., antennas 212a, 212b), which may be GPS antennae, are coupled to navigation module(s) 210. Steering controllers 214 (e.g., controllers 214a, 214b) separately steer selected wheels (e.g., front wheels 202a, 202d). Each controller illustratively comprises a screw drive and an angle sensor attached on its rotational axis to steer its corresponding wheel.

Robot 200 further includes power source(s) 220 (e.g., batteries, solar panels) and a small computing device 222 (e.g., a Next Unit of Computing (or NUC) by Intel® Corporation). Power sources 220 provide power to some or all electronically powered components of the robot (e.g., computing device 222, steering controllers 214, navigation modules 210, motors 204). Computing device 222 commands steering controllers to guide robot 200 to a desired destination, and commands motors 204 regarding speed and direction of the robot.

Return control 224 is engaged by a picker after the picker has loaded one or more full trays or other containers of harvested crop on the robot. In response to activation of control 224, computing device 222 causes the robot to report to a collection station. Stop control 226 may be engaged by any person, and causes the robot to stop (if it is moving) and stay in its current location until instructed otherwise (e.g., by disengagement of control 226 or instruction from a field computer).

Beyond the indicated components, robotic vehicle 200 includes one or more beds or cargo areas for receiving pickers' filled trays. Note that, in different embodiments, a robotic vehicle can carry different quantities of trays (e.g., 1, 2, 4, 10). Not depicted in FIG. 2 are a communication module, which may be part of computing device 222 and enables communication between robot 200 and a field computer, and an antenna connected to the communication module for conducting such communication.

In some embodiments, computing device 222 of robot 200 receives a scheduling command from the field computer, which includes a location to report to, and possibly a time (e.g., a no-later-than time and/or a no-earlier-than time) to be at that location. The computing device generates a path of intended movement from its current location to the assigned location, while avoiding any known areas and points to avoid, and commands the motors and steering controllers to traverse the path. Navigation modules 210 constantly report the robot's location and/or speed to the computing device to ensure the path is correctly followed. The computing device may regularly report its location and/or other information (e.g., path, speed, destination) to the field computer and/or other robotic vehicles.

In some embodiments, an Ackerman model is applied to motion control of a robotic vehicle such as robot 200 of FIG. 2, thereby allowing it to maneuver smoothly with minimal skidding. In these embodiments, for every combination of motion command, linear velocity $v_c$, and steer angle $\gamma_c$ issued by computing device 222, the model allows computation of steer angle commands ($\gamma_c^R$, $\gamma_c^L$) to be implemented by right and left steering modules 214a, 214b. Because the response time of the steering system of robot 200 may be slower than the motor system, motor speeds may be commanded to 'follow' the robot's rotational velocity corresponding to the sensed steering angles of the front wheels (where the steering occurs). Motor commands ($v_c^R$, $v_c^L$) to apply to the motors driving the rear wheels may therefore be calculated from current steering angle ($\gamma_c$ at time t) and the linear velocity command $v_c$.

Robotic Crop Transportation

Figure 3:
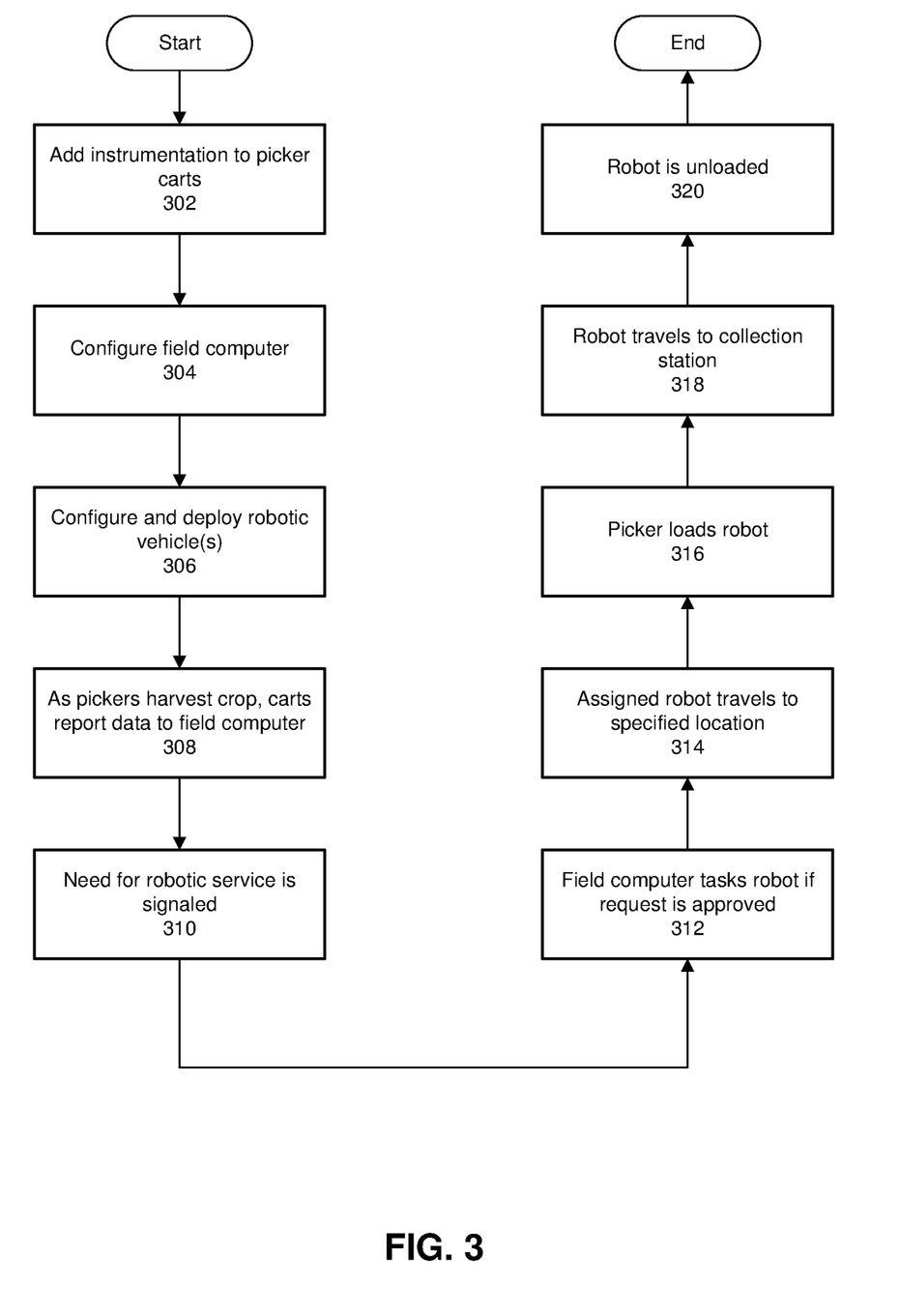
FIG. 3 is a flowchart demonstrating a method of conducting robotic crop collection and transportation, in accordance with some embodiments.

FIG. 3 is a flowchart demonstrating a method of conducting robotic crop collection and transportation, according to some embodiments. In some implementations, one or more of the specified operations may be omitted, repeated, and/or performed in a different order. Accordingly, the specific arrangement of steps shown in FIG. 3 should not be construed as limiting the scope of the embodiments.

In operation 302, pickers' manually operated carts are instrumented to include one or more load sensors, a communications package, one or more input and/or output controls (e.g., for requesting a robot, for signaling a picker whether a robot is en route), and/or other components that facilitate robotic crop transport.

In operation 304, a field computer is configured or reconfigured for managing robotic crop transport, in general and/or as needed specifically for a field to be harvested. Thus, software (described in more detail below) may be updated, historical harvest rates of pickers may be loaded, crop data may be loaded (e.g., type of crop, average weight of a full container of the crop), the geography of the field may be modeled, communication details (e.g., wireless address, protocol) of pickers' carts and/or robotic vehicles may be set, and so on.

In operation 306, robotic vehicles to assist the harvest are configured as necessary. For example, they may be programmed with spatial coordinates that model the field in order to locate furrows, crop rows, collection stations, charging stations, areas to avoid (e.g., drainage ditches, locations where equipment is stored), and/or other points of interest. They may also be programmed with movement rules, such as directions in which to traverse (or not traverse) furrows, movement speed, etc.

In operation 308, pickers harvest the crop and load their instrumented carts as they travel along furrows adjacent to crop rows/beds. The carts periodically report data to the field computer, such as the weight of harvested crop, current location (e.g., which furrow, how far along the furrow, coordinates within a cartesian coordinate system representing the field), etc. The carts may also, or instead, report their data when polled or queried by the field computer.

In some embodiments, such as those in which a robotic vehicle is not dispatched until a picker specifically requests one (e.g., by activating a control on his or her cart), the cart may refrain from periodically sending data to the field computer, or may send it less frequently. For example, it may not send its fill ratio and/or location until the picker initiates the robot request.

In yet other embodiments, although a cart's sensors may regularly read its current fill ratio, position, and/or other information, that data may be stored locally on the cart (e.g., in an SD (Security Digital) card). When the picker signals for service from a robotic vehicle, however, its current fill ratio and location will be reported to the field computer. Other information may also be sent (e.g., direction/path of movement of the cart).

In operation 310, a request for service from a robotic vehicle is signaled from a particular picker cart and received at the field computer. The request may be initiated manually by the picker that operates the cart (e.g., by manipulating a button, switch or other control), or automatically by the cart when it detects that the cart's fill ratio (i.e., how full of a load the cart contains) has reached or surpassed a threshold.

In operation 312, the field computer determines whether to approve the request, and assigns a robot to the request if it is approved. In some embodiments, this decision includes determining how close the picker cart is to a collection station. If it is less than a threshold distance, or if the field computer determines that it would be more efficient for the picker to manually deliver the crop, it will reject the request and respond to the picker's manual request by commanding the cart to display a notification (e.g., activate a light or LED (Light-Emitting Diode)) indicating that the request has been declined.

If the cart that signaled a robot request does not yet have a full load (e.g., as determined by the fill ratio reported by the cart), the decision may also involve predicting where the cart will be located when it has a full load. For example, from past location reports from the cart and timestamps associated with those reports, the field computer can calculate an overall or average rate of movement of the cart and harvest rate of the crop. The computer can then extrapolate how soon the cart's fill ratio will reach 100% and where it will be located. This location may be referred to as the predicted full (PF) point, or predicted full tray site, or some other term may be used.

From this information and data concerning each robotic vehicle participating in the harvest (i.e., current location, status (e.g., idle, traveling to collection station, fill ratio), movement speed, distance and path to PF), the field computer can precisely determine whether any of the robotic vehicles can service the request efficiently. Efficient service in these embodiments means that neither the picker nor the robot would encounter significant idle time by arriving at PF and having to wait for the robot or the picker for more than a threshold period of time (e.g., 1 minute, 5 minutes, the estimated amount of time it would take the picker to walk from PF to a collection station and back).

If the field computer approves the request, it assigns a robotic vehicle to the task, informs the vehicle where to go (i.e., PF) and may specify a route or path, which may depend on paths currently being traversed by other vehicles and/or actual or possible obstructions between the assigned robotic vehicle and PF. The field computer may also specify a time at which the robot should be at the specified location (e.g., to help the robot select a path), and may send other instructions. Also, the picker is signaled via his or her cart.

In operation 314, the assigned robotic vehicle travels to the specified location. It may travel autonomously, meaning that it generally traverses a route specified by the field computer, but avoids people, carts, robotic vehicles and other obstructions as necessary (e.g., using one or more cameras). Alternatively, the robotic vehicle may select its own path using an internal map of the field, while avoiding obstructions and/or locations to avoid identified by the field computer (i.e., coordinates, points, areas). If the robot cannot identify a valid path, it may alert the field computer, which may then specify a valid path to travel, or clear a path (e.g., by commanding one or more other robots to move), or assign the task to a different robot. Similarly, while a robot is traversing a path that it or the field computer assigned, the field computer may avoid placing other robotic vehicles in the assigned path until the robot has passed any possible point of collision.

Eventually the assigned robot (or a substitute) arrives at PF. Note that the location may be in the same furrow as the picker, a nearby furrow, or a headland area, but generally will not be more than several steps from where the picker's cart is predicted to be full.

In operation 316, the picker loads his or her harvested crop on the robot, and may retrieve one or more trays or other containers from the robot.

In operation 318, the robotic vehicle travels to a collection station to unload. This may be triggered manually by the picker (e.g., by activating a corresponding control on the robot) or automatically when the robot determines that the picker has finished loading it.

In some implementations, instead of heading to a collection station, the robot may be tasked to service another picker (e.g., depending on its capacity and/or fill ratio), or may await instructions. For example, after being loaded with one picker's tray(s) at one location in the crop field, the robot may be dispatched to one or more different locations to receive one or more additional trays from at least one other picker.

In operation 320, the robotic vehicle is unloaded at a collection station.

During harvesting of a field, robotic vehicles may travel from predetermined "parking" locations near collection stations and dynamically assigned locations within the field (e.g., to service a picker), then return to a parking location after being unloaded at a collection station (unless another dispatch instruction is received from the field computer). Thus, internally stored maps that feature locations and configurations of plant rows, furrows, collection stations, and other points and areas are essential, and allow the vehicles to generate paths between origins and destinations. For example, as described above, end points of each plant bed and each furrow may be mapped, as well as areas encompassing headlands, collection stations, and other areas of interest.

Speed profiles may be associated with different portions of the field so that, for example, a robot will travel at low speed when near a picker, but yet travel faster when traversing unoccupied furrows. As previously indicated, robots may report locations, travel speeds, intended paths, and/or other information to the field computer on a regular basis and/or when polled.

Field Computer

Figure 4:
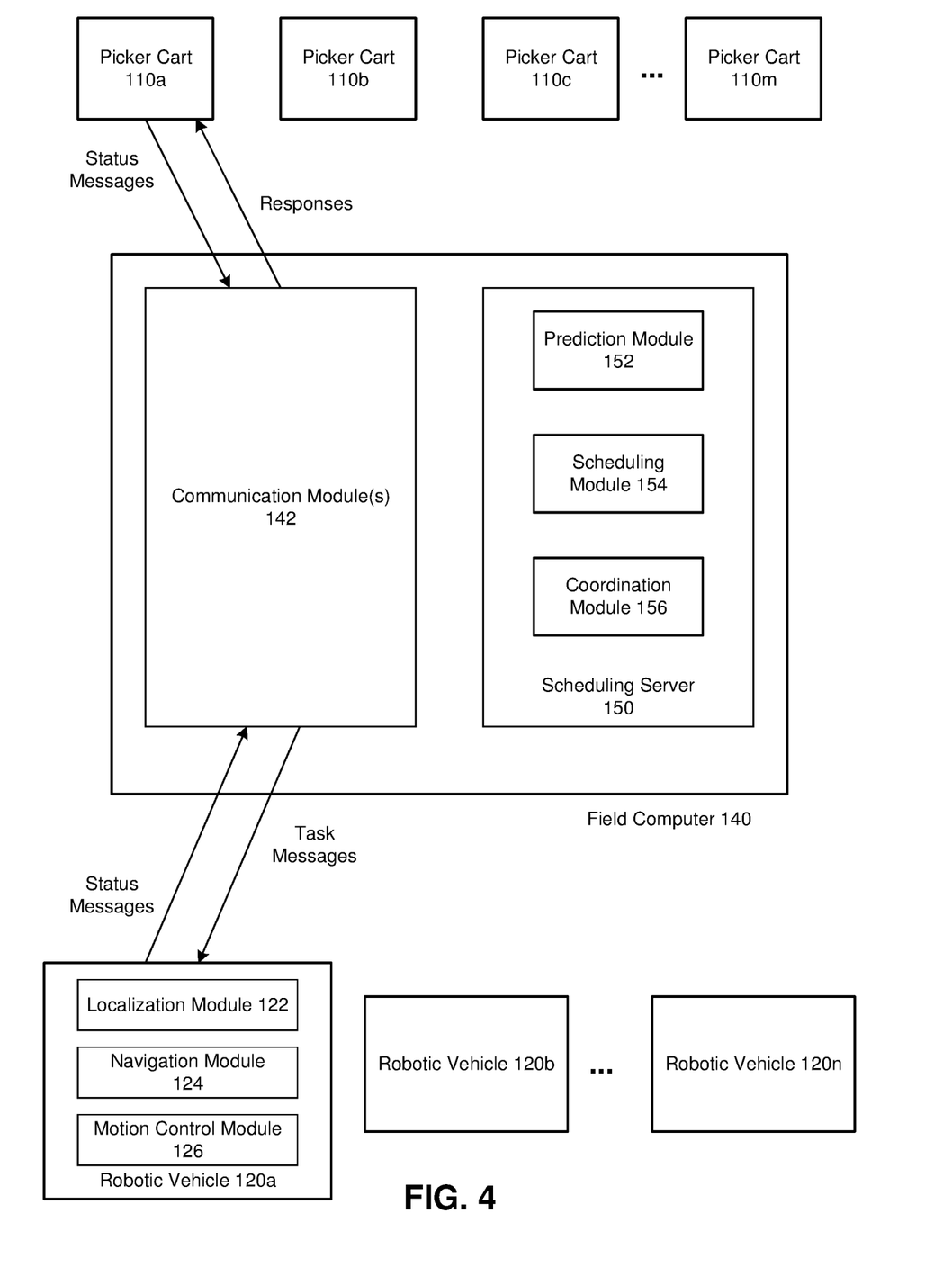
FIG. 4 is a block diagram of a system architecture, including a field computer, in accordance with some embodiments.

As described previously, a field computer or server manages robot-assisted crop harvesting by scheduling robot movements based on predicted needs for service by pickers. FIG. 4 is a block diagram of a system architecture, including a field computer, according to some embodiments. As previously described, a system for supporting robotic crop transportation during harvesting includes one or more picker carts 110, one or more robotic vehicles 120, and field computer 140.

Picker carts 110 (carts 110a-110n) communicate their state information (e.g., in response to being polled) to indicate to field computer 140 whether service from a robotic vehicle is desired. A response to a service request is signaled to the requesting cart in the form of an acceptance or rejection message, and the response is indicated to the cart's picker. Not shown in FIG. 4 are cart components described previously, such as one or more load sensors, at least one communication module, and input and output devices for receiving a picker's manual request for service and signaling to the picker a response to a service request.

Robotic vehicles 120 (vehicles 120a-120n) each include localization module 122, navigation module 124, and motion control module 126, in addition to components described previously (e.g., in association with FIG. 3). Localization module 122 consumes information from the vehicle's sensors, including GPS measurements, IMU (Inertial Measurement Unit) data, and wheel odometry, to estimate its current pose and report it (e.g., to the field computer, to navigation module 124).

Navigation module 124 ensures robotic vehicle 120 follows the path assigned by the field computer. In some embodiments, however, the navigation module may generate a path using identified constraints and requirements (e.g., destination, areas to avoid, objects to avoid), and then ensure the path is correctly traversed. For example, the field computer may command a robotic vehicle 120 to a particular furrow (i.e., one end or the other), after which the navigation module may be used to plot and traverse a path to a destination point (e.g., PF) within the furrow.

Given the planned path and the vehicle's current location and heading, the navigation module continuously outputs control commands to motion control module 126, which converts the motion commands to commands for operating the robot's propulsion (e.g., motors) and steering. Motion commands may be dispatched by the navigation module (and applied by the motion control mode) on a constant or almost constant basis while robotic vehicle 120 is in motion.

Field computer 140 comprises communication module(s) 142 and scheduling server (or scheduler) 150. Scheduling server 150 includes prediction module 152, scheduling module 154, and coordination module 156.

Communication module(s) 142 may include separate components, devices, processing modules, or other components for conducting different types of communication (e.g., wireless communications that employ different protocols or formats). For example, in some embodiments, the field computer communicates with picker carts using LoRa (Long-Range) technology, such as the LoRaWAN® (Long-Range Wide Area Network) protocol and architecture managed by the LoRa Alliance®. In these embodiments, the field computer can communicate with distant picker carts (e.g., over 1 km distant), at relatively low data rates, to receive status information from picker carts, including locations, fill ratios, and requests for service from a robot, and also to send responses to such requests (e.g., acceptances, rejections).

In some implementations of these embodiments, bandwidth of LoRa communications is 250 kHz, with a spread factor of 6, a code rate of 4, and with 14 dBm transmission power. The LoRa server may support a single channel or multiple channels, depending on the number of picker carts (e.g., less than or more than 10). Carts' communication modules are tuned to their assigned frequencies and report their statuses in response to polls from the server. For example, a picker cart may report whether the picker has requested service by activating a control, in which case the field computer must be notified. A poll addressed to a particular cart may indicate whether a previous service request from the cart has been approved or rejected, so that the cart can signal the status to its picker.

In contrast, communication with robotic vehicles may be conducted using a Wi-Fi standard due to the greater amounts of information that they must exchange with the field computer. As discussed above, for example, robotic vehicles regularly report their statuses (e.g., idle, unloading, parked, en route on an assigned task), locations, fill ratios (or indications whether or not they are full), current movement status (e.g., destination, ETA, route, heading, speed), etc. Further, the field computer must send messages regarding new (or current) tasks, assigned paths, collision avoidance data (e.g., points/areas to avoid), navigation commands (e.g., stop, pause for a specified period of time, adopt a different path), etc. In different embodiments, communications from field computer 140 to robotic vehicles 120 may involve broadcast and/or unicast messages, and robotic vehicles may communicate with the field computer at will or in response to polls/queries.

Prediction module 152 of scheduling server 150 subscribes to cart messages received by communication module(s) 140, and generates/updates predictions of cart statuses based on those statuses (e.g., harvesting rate, fill ratio, moving speed). Predictions are published or disseminated (e.g., to other components of the field computer) when a threshold fill ratio is reached and/or a service request button is pressed by a cart's picker.

Scheduling module 154 subscribes to robotic vehicles' status messages received by communication module(s) 140 and to predictions disseminated by prediction module 152. Given these data, the scheduling module runs a stochastic predictive scheduling algorithm and dispatches commands (e.g., tasks, task updates, paths) to robotic vehicles 120, especially commands to provide service to pickers, and acceptance/rejection messages to picker carts 110 (via communication module(s) 140).

Thus, based on service requests from picker carts, predictions regarding when the carts will be full, robotic vehicle statuses, and/or other information, the scheduling server calculates (and may continually or regularly revise or update) an optimized schedule for the robotic vehicles. The schedule may be published or broadcast to all robotic vehicles, and/or specific vehicles may be sent tailored instructions.

Coordination module 156 functions as the traffic manager for robotic vehicles in shared areas such as the headlands, particularly to avoid collisions with other objects (e.g., people, equipment, other robotic vehicles). The coordination module or some other component of field computer 140 may also provide users with insight into (e.g., visualizations of) statuses of robotic vehicles 120, picker carts 110, and/or other aspects of the system.

Figure 5:
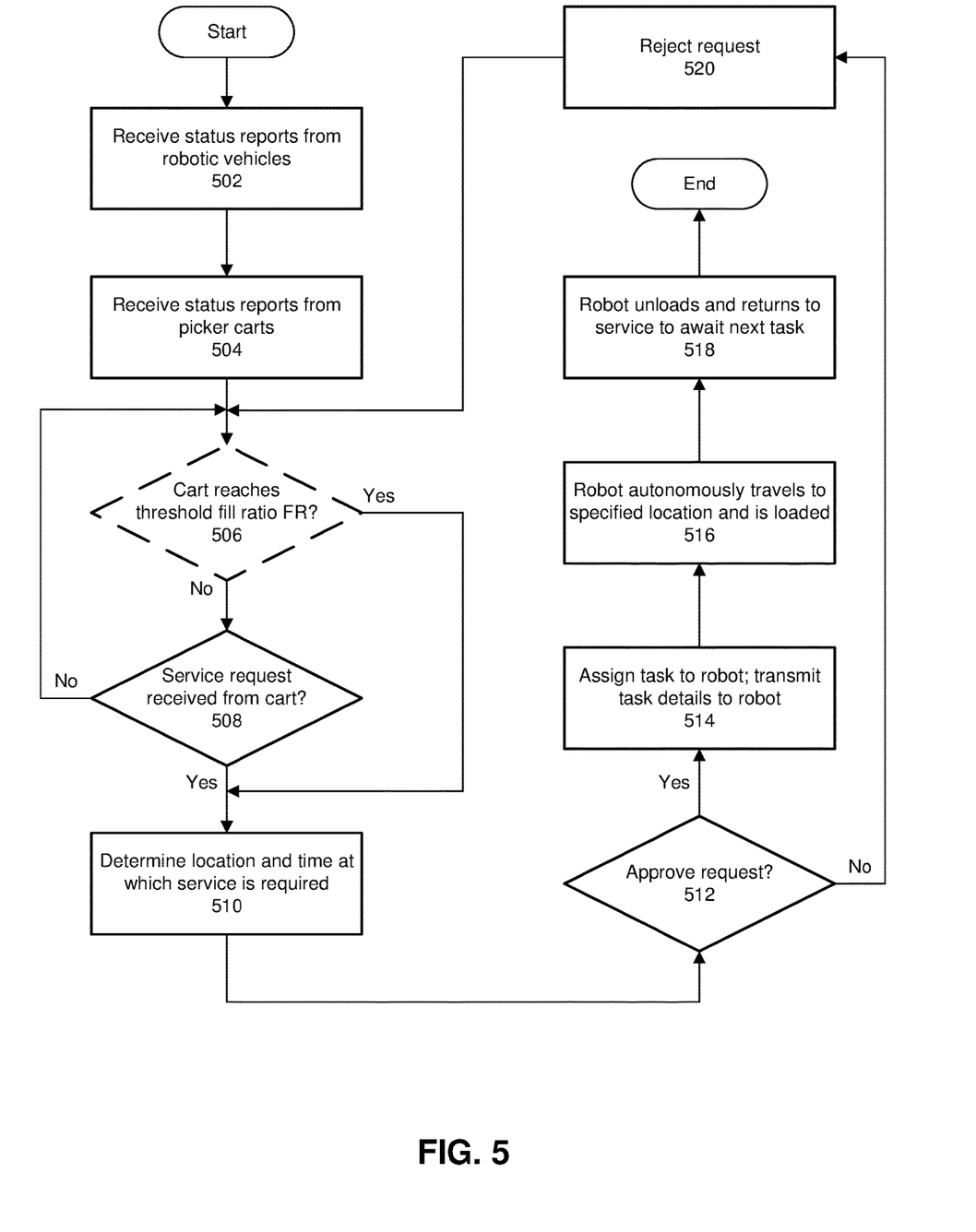
FIG. 5 is a flowchart of a method of operating a field computer to support robotic crop transport, in accordance with some embodiments.

Software executed by the field computer to schedule and dispatch robots to pickers may accommodate variations in pickers' harvesting rates and patterns, the distribution of ripe crops throughout the field being harvested, sensor noise, and/or other factors. For example, robots may be required to travel more slowly when near collection points and/or in shared headland area where multiple humans and/or robots may be located. Also, scheduling may become more accurate over time as individual pickers' harvest rates are learned from data collected by the field computer FIG. 5 is a flow chart of a method of operating a field computer to support robotic crop transport, according to some embodiments. In some implementations, one or more of the specified operations may be omitted, repeated, and/or performed in a different order. Accordingly, the specific arrangement of steps shown in FIG. 5 should not be construed as limiting the scope of the embodiments.

In operation 502, the field computer receives regular, irregular, or periodic reports from robotic vehicles concerning their statuses. For example, the vehicles may be polled on a repeating basis, at which time they individually report information such as their current location (e.g., by grid coordinates, by GNSS coordinates), current status (e.g., parked, charging, working on an assigned task), destination (if in motion), and/or other information.

In operation 504, the field computer receives regular, irregular, or periodic reports from robotic vehicles concerning their statuses. For example, the vehicles may be polled on a repeating basis, at which time they individually report information such as their current location (e.g., by grid coordinates, by GNSS coordinates), weight of harvested crop (and/or fill ratio), whether the cart's associated picker has requested service from a robotic vehicle, and/or other information.

It should be noted that operation 502 and 504 may repeat (individually and/or collectively) throughout execution of the method depicted in FIG. 5.

In optional operation 506, the field computer may proactively determine or calculate whether any picker cart has reached a threshold fill ratio or FR (e.g., 80%, 95%). In these embodiments, for example, after a picker's cart reaches this threshold FR, the cart's predicted fill or predicted full-tray (PF) point may be repeatedly calculated and recalculated. Similarly, travel times for one or more robotic vehicles to these FPs may be regularly calculated to determine whether a vehicle must be dispatched in order to avoid idle time on the part of the picker. If a picker's cart has reached the threshold FR, which may differ from one picker or cart to another, the method advances to operation 510; in this event, the cart will be treated as a 'requesting cart.' Otherwise, the method continues at operation 508.

In operation 508, if a picker has manually requested service from a robotic vehicle (e.g., by operating a control on his cart), the method of FIG. 3 continues to operation 510; otherwise, the method returns to operation 506 (or either of operations 502 and 504). As previously discussed, a cart may proactively signal the field computer when its picker requests a robot, or may indicate this status in response to a poll or query from the field computer.

In operation 510, the field computer calculates or retrieves the requested cart's PF and the time at which the cart is expected to arrive at PF. As previously explained, calculating a cart's PF in some embodiments requires consideration of its current FR, the picker's harvest rate, and possibly other information. For example, historical data regarding crop yield from the current field may indicate that the picker is in or approaching an area of significantly greater (or lesser) yield than the area he has recently harvested, which may affect his short-term harvesting rate.

In operation 512, the field computer (e.g., predictive scheduling software executing on the field computer) decides whether to accept or reject the manual request (from operation 508) or the predicted/automated request (from operation 506). In some implementations, a dynamic predictive stochastic scheduling algorithm is applied that accounts for uncertainties regarding the picker's harvest rate and varying crop-yield in the picker's furrow. Thus, for each robotic vehicle that is idle or that will be idle or available to service the request, the field computer determines how soon the vehicle can arrive at the associated PF, based on current location, speed limits, travel speed of the vehicle, and/or other information.

If no vehicle can arrive at PF before the cart is predicted to arrive, or within a threshold period of time after the estimated time of arrival (ETA), or if PF is located in proximity to a collection station (e.g., within some linear distance), the request will be rejected and the method advances to operation 520. Otherwise, the request will be accepted and the method continues at operation 514.

In scenarios in which multiple service requests are pending simultaneously (e.g., awaiting acceptance or rejection), requests may be prioritized in some manner. For example, requests from carts that are furthest from a collection station may be answered first (with acceptances as much as possible), so that their pickers are least likely to have to manually deliver their harvested crop to a station and thereby incur non-productive time.

In operation 514, the manual or automated request is approved and the picker's cart is signaled accordingly. The cart then signals the picker (e.g., with an LED or light) that a robotic vehicle is en route. The field computer tasks a selected robotic vehicle by identifying PF (e.g., by coordinates), a path to follow to PF, speed limits (if/as applicable), objects and/or areas to avoid, and/or other information.

The selected robotic vehicle may be any vehicle able to reach PF without requiring any (or significant) wait time by the picker, but the field computer may attempt to make an efficient choice if multiple robotic vehicles are able to service the request. For example, if the robotic vehicles are able to service multiple pickers (e.g., receive multiple trays) before unloading at a collection station, the field computer may send one that is almost full, especially if PF is near a collection station.

In operation 516, the assigned robotic vehicle autonomously travels to PF, using the assigned path (if one was assigned), while avoiding objects as necessary (e.g., pickers that cross the vehicle's path of movement, other robots). In these embodiments, it may be noted that the assigned robotic vehicle may be dispatched and start moving along the path before the picker reaches PF and before the picker's cart is full. As the robotic vehicle approaches PF, it may be redirected to a new/adjusted PF if, for example, the picker's instantaneous harvest rate changes so much that PF changes more than a threshold distance (e.g., a few meters).

The picker eventually loads his tray or trays of harvested crop on the robotic vehicle, retrieves an empty tray if necessary, and manipulates a control on the vehicle that releases it from its current task of servicing the picker's request. This may cause the robotic vehicle to automatically travel to a collection station via a path assigned by the field computer or calculated by itself, or may free it to service another request if it is not fully loaded.

In operation 518, the robotic vehicle reports to a collection station and is unloaded. It may then receive a complement of empty trays and either return to service (e.g., to await a new task) or assume an idle state if ordered to park somewhere, report to a charging station, etc. After operation 518, the method may end or return to an earlier operation.

In operation 520, the manual or automatic request is rejected. If the request is a manual request, the cart is signaled accordingly, and it in turn signals the picker as to the disposition of the request. No signaling may be necessary if the request was an automated request. After operation 520, the method may end or may return to another operation (e.g., operation 502, operation 506).

In some embodiments, only one robot may occupy a given furrow at a time, assuming that only one picker works within each furrow. In other embodiments, such as when long furrows are operationally or virtually divided (e.g., by a baseline dividing a field into multiple sections), multiple robots may simultaneously occupy a furrow.

To further avoid collisions between robots, when two or more robots occupy a given area (e.g., a headland) or have paths traversing the same area, or at least when their paths are determined to intersect, the field computer may assign the robots different priorities based on their current locations (e.g., distance from the point or area of intersection), paths, and/or other information (e.g., assigned tasks). For example, highest priority may be assigned to a robot already within the area of potential collision or to the robot closest to that area. The other robots may be commanded to pause or to alter paths if necessary to prevent a collision and prevent one robot from blocking another, such as by stopping and waiting until their paths are no longer determined to intersect.

Dynamic Predictive Scheduling

In a perfect operating environment, a system for robotic transport of harvested crop would be able to predict with 100% accuracy when a picker requires service (i.e., when the picker's crop tray or trays will be full). In such an environment, all robots assisting in a harvest can be scheduled in an optimized manner to reduce or eliminate picker wait time (i.e., time spent waiting for the arrival of a robot).

However, in the real world, scheduling of robots to service pickers' requests for robotic transport of their harvested crop necessarily involves some amount of uncertainty due to varying harvest rates and/or movement rates among the pickers, the distribution of ripe crop, sensor noise (e.g., from carts' load sensors), robot movement speeds (e.g., different speed limits in different areas of a field), and/or other factors. Despite the uncertainties, the field computer (e.g., a scheduling server) strives to minimize pickers' nonproductive time. Because not all service requests can be accurately predicted, scheduling decisions may include the ability to reject service requests (and require a picker to manually deliver a crop tray) in order to reduce the average nonproductive time of all pickers.

The field server therefore continually or regularly engages in stochastic predictive scheduling of the robots assisting a given harvest by consuming the picker carts' regular reports from each cart (e.g., current load or fill ratio, current location) to calculate predicted times and locations at which each cart will need to be serviced (i.e., to retrieve one or more full trays) and the average and the uncertainty (variance) in the predicted times and locations. For example, as each cart reports its status, the field computer may update its predictions regarding the cart's next need or request for service.

In addition, many (e.g., 50, 100, 200) different future scenarios about the spatio-temporal distribution of service request for all pickers can be generated by, for example, sampling the uncertainties/variance and combining all carts' aggregated (e.g., averaged) predictions. In this manner, the scheduling server or other component of the field computer finds a good or best possible robot schedule for each scenario (e.g., for each of multiple different uncertainties) and combines the individual schedules into a single robot schedule. Because this scheduling is conducted in real-time and has immediate consequences regarding pickers' productivity, there is a limit on how much computational time and effort can be expended.

In some embodiments, stochastic predictive scheduling of crop-transport robots builds upon a form of deterministic predictive scheduling or modeling in which a prediction regarding when and where a given picker will need service from a robotic vehicle may be assumed to be accurate. For example, by introducing the uncertainties described above, a model for deterministically predicting a robot schedule can account for at least some real-world constraints.

In these embodiments, deterministic predictive scheduling of a team of crop-transport robots is a variant of the Capacitated Vehicle Routing Problem (CVRP). However, in some embodiments of the current system, each robot can only serve one tray-transport request (i.e., it can carry only one tray at a time), and each task assigned a robot starts and ends at a collection station. Hence, scheduling of the crop-transport robots can be modeled as a parallel machine scheduling problem (PMSP) with the objective of minimizing the mean of all pickers' waiting times associated with all transport requests, which may be expressed as $\Delta T^w$. However, in other embodiments, a robot can carry multiple trays simultaneously, and therefore may be assigned multiple tasks before unloading at a collection station, and may travel directly from one location (to service one request) to another location (to service another request).

In some embodiments, each picker from a set $S^P=\{P_1, P_2, \ldots, P_Q\}$ of Q pickers harvests fruits in one or more trays carried on a picking cart. A team of M similar or identical robot vehicles $S^V=\{V_1, V_2, \ldots, V_M\}$ brings empty trays to the pickers and carries full trays to a collection station, the coordinates of which are known. As already described, a scheduling algorithm provided herein has access to a set of predicted tray-transport requests (or service requests) $S^R=\{R_1, R_2, \ldots, R_N\}$ where $0 \le N \le Q$, and computes an updated schedule every time a new predicted request enters $S^R$ and there is a robot available to be dispatched.

A given request $R_i$ comprises a prediction of the amount of time (e.g., in seconds) until the associated fruit tray is full ($\Delta t_i^f$), which represents the difference between current time t and the time at which the tray associated with request $R_i$ is full ($t_i^f$), and the predicted coordinates ($L_i$) of the associated cart and picker at time $t_i^f$. The dispatching of a robot in some embodiments is non-preemptive, meaning that once a robot is dispatched upon an assigned task the scheduler will not change the task or assignment. It may be noted that when data reported by a picker cart indicates that the picker will reach the end of his current furrow before his tray is full, no request is added to set $S^R$ for that picker unless, perhaps, it is known which furrow he will enter next to continue harvesting.

The travel time required for a robot to travel from a collection station $L_s$ to $L_i$—and back—is computed by approximating the path as one straight line segment on the headland that hosts the collection station and another straight line segment inside the furrow that corresponds to $L_i$. The one-way traveled distance $D_{s,i}$ is the corresponding Manhattan distance from $L_s$ to $L_i$ along the path. The corresponding one-way travel time may be represented at $\Delta t_i^u = D_{s,i}/v^r$, where $v^r$ is the robot's velocity, which may be assumed to be constant and the same for all robots, which may be an average of the speed it will travel along the path if different speed limits apply to different segments, or which may be estimated or calculated in some other way.

In some embodiments, the scheduling algorithm selects a robotic vehicle $V_k$ to serve a request $R_i$ and dispatches the robot at time $t_{ki}^d$. The robot will arrive at $L_i$ (from $L_s$) at time $t_{ki}^a$. The picker's waiting time, if any, may be represented as $\Delta t_{ki}^w$, and a constant time $\Delta t^L$ is assumed for loading the robot. After being loaded, the robot again travels between $L_i$ and $L_s$ and is unloaded, possibly having to wait in line for other robots to unload. Therefore, the total time needed by $V_k$ to service request $R_i$ and be ready to receive another task can be calculated at the time necessary to make a round trip between $L_i$ and $L_s$ ($2 \Delta t_i^u$) plus loading time ($\Delta t^L$) and unloading time ($\Delta t^{UL}$), which may be represented as $\Delta t_i^p$.

A predictive scheduling model or module may need to generate robot schedules that handle various constraints, such as the following in some implementations: (1) each schedule must consider all requests in $S^R$; (2) each request that is approved is assigned to only one robotic vehicle; (3) the robot assigned to a request is not dispatched until it is available (e.g., not working on another task); (4) a robot starts and ends a task at the same collection station (or other designated point); (5) a robot assigned to a task serves only the corresponding picker, no others (until the current task is complete), and cannot be preempted.

The described parallel machines scheduling problem can be seen as a variant of the well-known job shop problem (JSP) and can be expressed as $Pm|r_i|\Sigma C_i$ where Pm represents identical parallel machines, $r_i$ means that the $i^{th}$ job cannot be processed until its release time, and $\Sigma C_i$ indicates that the objective criterion is to minimize the sum of the completion times of all jobs. Meanwhile, a sub-optimal— but faster—approximation algorithm may also be implemented because scheduling must be performed in the field with limited computational resources, and deterministic scheduling is an important component of stochastic predictive algorithms that incorporate uncertainty. For example, a branch-and-bound (BAB) algorithm converges to the global optimal solution of each modelled problem, while an efficient approximation algorithm converges to a sub-optimal solution.

The BAB algorithm systematically computes a complete enumeration of all candidate solutions by creating a tree that represents the full set of solutions, using state-space search. BAB explores branches of the tree, which represent subsets of the solution set. It uses estimated upper and lower bounds of the optimal solution along with the value of the best solution found so far to "prune" branches of the tree that will result in suboptimal solutions. Hence, the efficiency of the BAB algorithm depends on accurate and efficient estimation of the lower bound of the optimal solution. In some implementations, illustrative lower bounds may be determined by removing one or more of the constraints identified above and observing the results, such as allowing preemption and job-splitting, and allowing all jobs to be processed immediately (e.g., before a given robot completes its current task).

As opposed to the branch and bound algorithm, approximation algorithms compute approximate solutions to NP-hard (non-deterministic polynomial-time hardness) problems with provable guarantees on the distance of the returned solution to the optimal one (given some metric). The approximation of such algorithms is guaranteed to be within a multiplicative or additive factor of the optimal solution even in the worst cases. In some embodiments, an efficient CONVERT algorithm can be used to solve the original $Pm|r_i|\Sigma C_i$ problem. CONVERT first relaxes the original problem by allowing preemption and job-splitting, thus turning it into a problem that can be solved in polynomial time. Then the solution of the relaxed problem can be adjusted to generate a solution to the original problem.

At each time step (e.g., one second, multiple seconds), the predictive scheduling module receives and checks the updated robot states and service requests. The scheduling algorithm is executed only when there are robots available (e.g., at the collection station or some other location) and $S^R$ is not empty. The scheduling module will solve the modeled problem and store the computed schedules in a schedule table. Each schedule consists of the available robotic vehicle index $V_k$, the request location $L_i$, and the dispatch time $t_{ki}^d$. After a dispatching command is sent, the corresponding request and schedule are removed from $S^R$ and from a schedule table, respectively.

It may be noted that scheduling may be adjusted for different operating conditions and equipment. For example, the preceding discussion of stochastic predictive scheduling assumes for the most part that a robot's capacity is one tray, in which case it must report to a collection station to unload one full tray from one picker before being dispatched to service a request from another picker. However, in some implementations a robotic vehicle may accommodate multiple full trays of crop, in which case a robot that is en route to service one request and that will have room for one or more additional trays after servicing the request, may be considered for dispatch to service another request before completing the current task or before returning to a collection station to drop off a partial load.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A robot-assisted harvesting system, comprising:
a plurality of instrumented picker carts with containers for storing crop harvested by pickers within a field;
multiple robots for conveying the containers to collection stations; and
a computing device comprising:
one or more communication modules for communicating with the picker carts and the robots; and
a scheduling server for predicting when a robot should be dispatched to receive a container from a picker cart.

2. The system of claim 1, wherein the scheduling server comprises:
a prediction module that predicts a target time at which a first container of a first picker cart will become full and a target location on the field at which the first picker cart will be located when the first container becomes full; and
a scheduling module that selects one of the multiple robots and commands the selected robot to travel to the target location;
wherein the scheduling module commands the selected robot to begin travelling toward the target location before the target time.

3. The system of claim 2, wherein the scheduling server further comprises:
a coordination module that coordinates movement of two or more of the multiple robots when they are traversing paths that intersect.

4. The system of claim 2, wherein the scheduling module receives a service request from a given picker cart and responds to the service request to indicate whether one of the multiple robots will be dispatched to receive a container from the given picker cart.

5. The system of claim 2, wherein:
the scheduling server transmits to the selected robot a path to the target location; and
the selected robot autonomously traverses the path while avoiding any object that may obstruct the path.

6. The system of claim 2, wherein:
the scheduling server identifies to the selected robot one or more obstructions to reaching the target location; and
the selected robot selects and traverses a path to the target location while avoiding the one or more obstructions.

7. The system of claim 1, wherein each picker cart comprises:
one or more sensors for detecting a fullness of a container carried by the cart;
a communication module for reporting the fullness to the computing device;
an input component operable by a picker to request service from a robot; and
an output component for signaling to the picker whether the request for service is accepted or rejected.

8. The system of claim 7, wherein the scheduling server:
receives a first signal indicating operation of the input component; and
initiates a second signal to the picker cart to cause the output component to be activated.

9. The system of claim 1, wherein each robot comprises:
means for locomotion;
means for steering the robot;
one or more navigation modules for determining a position of the robot;
a communication module for communicating with the computing device; and
one or more power sources for powering the means for locomotion, the means for steering, the one or more navigation modules, and the communication module.

10. The system of claim 9, wherein each robot further comprises:
a memory for storing a map of the field.

* * * * *